United States Patent
Viggiano (10) Patent No.: US 10,082,209 B1
(45) Date of Patent: Sep. 25, 2018

(54) IN-LINE VALVE (71) Applicant: Anthony J Viggiano, Groton, CT (US)

(72) Inventor: Anthony J Viggiano, Groton, CT (US)

(73) Assignee: ALPHA HOSE, LLC, Weston, FL (US)

( * ) Notice: Subject to any disclaimer, the term of this patent is extended or adjusted under 35 U.S.C. 154(b) by 0 days.

(21) Appl. No.: 15/354,849

(22) Filed: Nov. 17, 2016

Related U.S. Application Data (60) Provisional application No. 62/256,689, filed on Nov. 17, 2015.

(51) Int. Cl.
*F16K 1/12* (2006.01)
*F16K 1/46* (2006.01)
*F16K 27/02* (2006.01)

(52) U.S. Cl.
CPC .............. *F16K 1/123* (2013.01); *F16K 1/465* (2013.01); *F16K 27/0254* (2013.01)

(58) Field of Classification Search
CPC ...... F16K 1/123; F16K 1/465; F16K 27/0254; Y10T 137/3367

USPC .................................. 251/343, 344; 137/219
See application file for complete search history.

(56) References Cited

U.S. PATENT DOCUMENTS

| 4,589,439 A * | 5/1986 | Steingass | ................ F16K 1/123 137/219 |
| 7,195,181 B2 * | 3/2007 | Steingass | ................ B05B 1/304 169/14 |
| 2004/0035462 A1 * | 2/2004 | McCarty | ................ F16K 1/123 137/219 |

* cited by examiner

*Primary Examiner* — Eric Keasel
(74) *Attorney, Agent, or Firm* — C. Nessler (57) ABSTRACT

An in-line valve, particularly suited for use with a domestic garden hose, comprises a valve body, preferably made of two press-fitted-pin mating parts. A shuttle moves linearly within the bore of the valve body when force is applied to tabs which project through openings in the valve body. The end of the shuttle sealingly engages and disengages with a plug that is centered within the bore. The plug comprises struts and fins, configured for good flow characteristics. The combination of cross section of the shuttle relative to the bore, and the fits and properties of O-ring seals, are critical for easy manual operation of the valve.

19 Claims, 6 Drawing Sheets

IN-LINE VALVE

This application claims benefit of provisional patent application Ser. No. 62/256,689, filed Nov. 17, 2015, the disclosure of which is hereby incorporated by reference in its entirety.

TECHNICAL FIELD

The present invention relates to a flow control device for use in-line, particularly as a valve in connection with domestic garden hoses.

BACKGROUND

Typically, a domestic garden hose has a female end that screws onto the threaded nozzle of a bibcock (faucet), and an opposing threaded male end for attachment of another hose, a valve or some other water device. The ends may be made of plastic or metal.

Most commonly, flow of water into a hose is managed by turning of the bibcock handle and associated valve stem. Some users have found it more convenient to control flow by mounting a ball valve on the bibcock nozzle, and attaching the hose to the ball valve. Flow can then be controlled by turning a lever attached to the ball of the ball valve, which is for many persons an easier way of turning on or off the flow of water. Alternatively, a ball valve may be mounted at the downstream or discharge end of the hose; that makes more convenient the changing of fittings or accessories at the discharge end of the hose. However, having a ball valve at the downstream end usually requires most users to use two hands to operate the valve: one to hold the valve body, the other to rotate the lever and associated ball.

Another limitation of a ball valve as a flow control device relates to the inherent construction of the valve and its size. In particular, since a ball rotates within a socket of a housing, the housing is necessarily larger than the ball. It follows that if, as is desirable, the diameter of the hole through the ball approximates the hose internal diameter, the ball outside diameter and housing dimension are necessarily increasingly larger. When such apparatus at the end of the hose is large and bulky, it can be awkward to handle and prone to damage and catching on shrubbery and the like during use. Alternatively, if the housing, ball and the hole through the ball are all made small, flow is restricted compared to what it desirably would be.

Thus there is a need for an improved flow control valve which is convenient for mounting at either the downstream end of the garden hose or the upstream end. Any valve should be compact in exterior dimensions, durable, and easily turned on and off regardless of whether or not the hose upstream is pressurized, and whether or not there is a flow blocking fitting downstream of the valve.

SUMMARY

An object of the invention is to provide a valve for use with a garden hose, where the valve is compact in exterior dimension, easily opened and closed by the user, durable, and economical to manufacture. A further object is to provide a valve with lengthwise closing and opening actuating means, which valve is easily opened under different use conditions, including when there is or is not pressure in at the downstream end of the valve.

In accord with embodiments of the invention, a valve has a body with a circular bore within which a generally cylindrical shuttle moves lengthwise. The circumferential end of the shuttle engages and disengages a plug in the center of the downstream end of the valve flow path when the shuttle is moved lengthwise by means of one or more tabs that project through openings in the valve body. Thus the area of the flow path in vicinity of the plug is changeable to the extent it can be reduced to zero, and water flow through the valve is thereby controlled. A preferred plug comprises a plurality (preferably four) of struts which support the nose of the plug in the flow path. Each strut preferably has one or more tapered fin on either side to strengthen the strut and straighten flow through as it passes by the plug when the valve is open.

In different embodiments of the invention, (a) the shuttle has a constant diameter bore and constant diameter exterior and the areas of the upstream and downstream ends of the shuttle are equal; (b) the area of the shuttle downstream end is larger than the area of the upstream end of the shuttle due to either a taper in the bore of the shuttle or a step in the bore of the shuttle or a step on the exterior diameter of the shuttle; and (c) the area of the shuttle upstream end is larger than the area of the shuttle downstream end due to either a taper in the bore of the shuttle or a step in the bore of the shuttle or a step on the exterior diameter of the shuttle. The different features of these different configurations are described below.

When a valve comprises a shuttle with a constant diameter bore and constant diameter exterior, a critical feature is that the shuttle have a cross sectional area which is less than 20 percent of the flow area, more preferably in the range of 10-17 percent of the flow area of the bore of the valve immediately upstream of the shuttle. When that criticality is not achieved, opening and closing the valve can require excessive force and be too difficult to operate using one hand (thumb) by for the typical garden hose user. For similar reason O-rings having a Durometer of 60 or less, contrary to accepted practice for such seals, are used to seal the space between the exterior ends of the shuttle and the bore of the valve body, which space is 0.005 inch or more, preferably 0.007 inch, also contrary to accepted practice. If conventional design is used the valve cannot be readily opened and closed, irrespective whether water is present.

O-rings seal the space between the shuttle and the bore of the body; and an O-ring is mounted on a circumscribing groove at the end of the plug to form a seal with downstream end of the bore of the shuttle, when the shuttle is moved to a position which stops fluid flow. Preferably the plug comprises a plurality of lands, downstream of the O-ring groove in the plug, that extend radially outwardly to keep the O-ring in place under changing flow conditions.

In accord with further embodiments of the invention, one or more, preferably all, of the following features are present in a plug associated with a valve: (a) the O-ring groove on the plug, which contains the seal that mates with the bore of the shuttle, has a curved bottom shaped to fit the cross sectional diameter of the O-ring; (b) the O-ring is about 0.004-0.006 inch greater in radius than is the radius of the bore of the shuttle which overlaps the O-ring; and, (c) the O-ring has a Durometer of 70; and (d) the O-ring is stretched 10-20 percent or more, when the O-ring is placed in the groove prior to use of the valve.

In further accord with the invention, embodiments of valve body comprise two mating body parts that mate at facing surfaces where there are cutouts within which are the tabs of the shuttle. Before assembly one mating part has a plurality of press fitted pins that project from the mating surface of the part. During assembly, the pins are press fitted into cavities on the mating body part. The pins and body parts are made of a comparatively soft metal such as an aluminum alloy. During press fitting there is otherwise-undesirable galling, with the result that the parts are held together without other means.

The foregoing and other objects, features and advantages of the present invention will become more apparent from the following description of preferred embodiments and accompanying drawings.

DESCRIPTION

Figure 1:
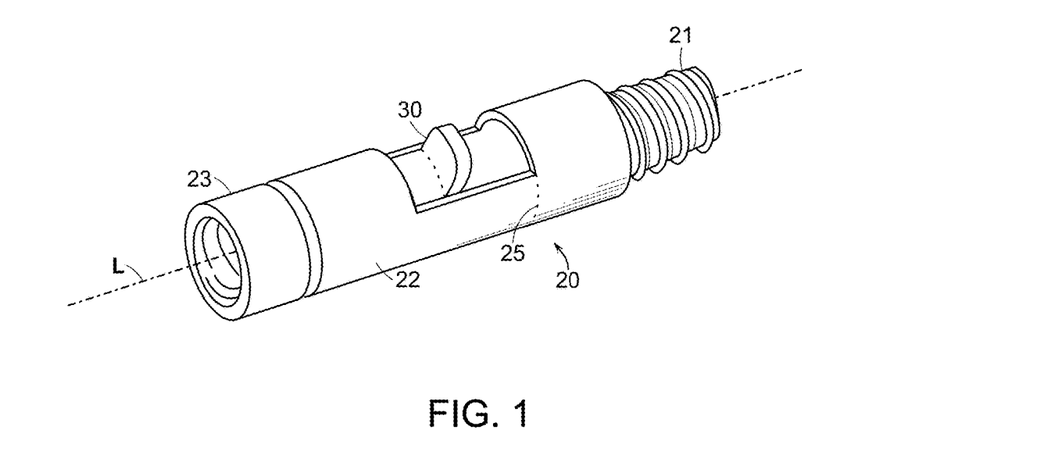
FIG. 1 is a perspective view of an inline valve having threaded ends for connection to garden hose type fittings.
Figure 1A:
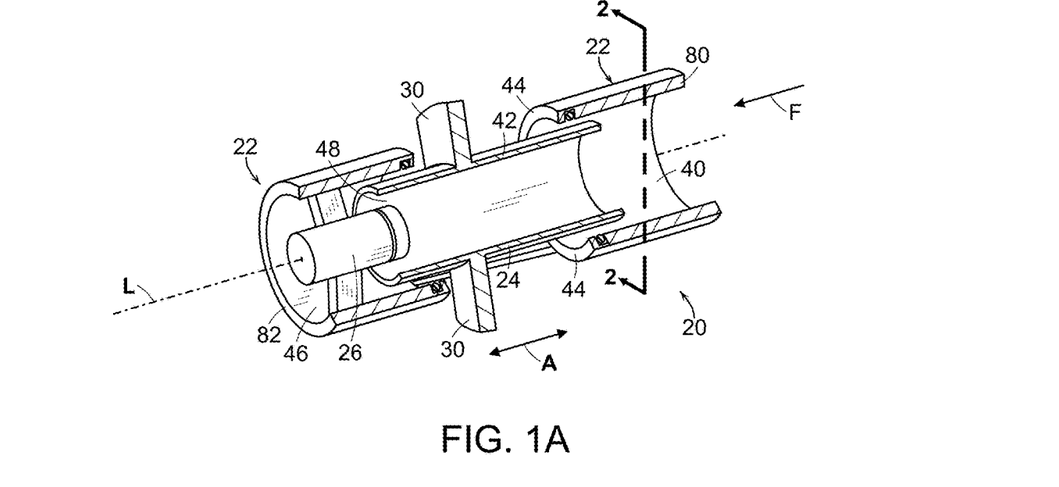
FIG. 1A is a partial cut-away perspective view of an inline valve like that of FIG. 1, without the threaded ends.
Figure 2:
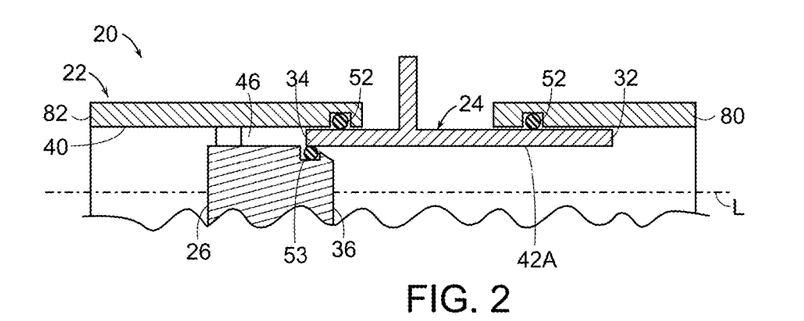
FIG. 2 is a partial lengthwise cross section of the valve of FIG. 1.

FIG. 1, FIG. 1A and FIG. 2 show an exemplary valve 20 of the present invention. The valve comprises a tubular body 22 having a length axis L. In use, water flows along a lengthwise path toward the downstream end of the valve, to the vicinity of plug 26. FIG. 1 shows exemplary valve 20 having opposing end connecting features, namely male threaded end 23 and female threaded end 21, both preferably shaped for connection to common U.S. garden hose fittings.

In one use of the present invention, the inlet end of the valve is a male fitting which is screwed onto the typically female fitting at the end of conduit, typically a flexible hose that runs from a water supply source. In an alternate use the threaded female inlet end of the valve may be screwed onto the threaded nozzle of a bibcock that is part of a plumbing system water supply, and the male threaded end is connected to the female fitting at the end of a hose or some other conduit.

In other embodiments of valves of the present invention the valve may have connecting features at one or both of the ends which comprise other kinds of threads and or other non-threaded connecting features, such as those usually termed "quick-connect." In many of the Figures here the connecting features at the ends of the valve are not shown, for simplicity. The components of a valve, particularly the body, may be fabricated as assemblies of smaller pieces to enable easy assembly and economic fabrication. For example, body 22 is preferably comprised of two mating pieces that mate at joint 25 which is shown by a dashed line in FIG. 1. Details of such feature are more particularly described in connection with FIG. 21, 22. Again, for clarity of illustration, many of the details of construction which enable convenient or economic fabrication are not shown in drawings which show other features of the invention.

Water is an exemplary fluid that is referred to herein, in connection with describing the use of valves. Valves of the present invention may be used with any fluid, including compressible gases. While valves are described here in terms of upstream ends and downstream ends, it is within contemplation that certain configurations of valves of the present invention may alternatively be used with fluid flow in a direction opposite to that which is described by example.

Valve 20 comprises shuttle 24, which is configured for movement lengthwise, to enable, throttle and close off flow through the valve. The shuttle is slidably contained within body 22 form movement along the lengthwise axis L. The shuttle preferably has two tabs 30 which project through opposing side openings 44 in the body 22, so that a user can manually move the shuttle lengthwise. The openings 44 are preferably elongate in the lengthwise direction of the valve, to provide for good retraction of the shuttle within the constraint of maintaining valve body strength by not making the circumferential dimension of the openings too great.

The shuttle has an outside surface that closely fits within the bore 40 of the tubular body 22. Seals, such as O-rings 52, sit within grooves in the bore of body 22 just upstream and downstream of the openings 44; the seals circumscribe the shuttle cylindrical outside surface. The opposing side tabs, which may also called ears, enable the user to move the shuttle lengthwise. Preferably, the circumferential dimension of at least one of the tabs is such that it fits the circumferential dimension of the opening 44 through which it projects.

Figure 4:
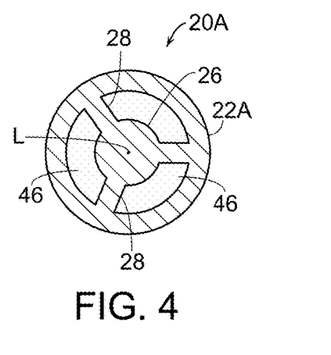
FIG. 4 is a transverse cross section through the plug region of the valve shown in FIG. 3.

Plug 26 is fixedly centered within the bore of the body, preferably by radially running struts 28 at the downstream end of the body of the plug. The spaces between struts 28 comprise flow channels 46 which demark the water flow pathway around the plug. See the cross section of FIG. 4 for more particularity. Fewer or lesser struts may be used. Alternative structure for holding the plug in place within the valve body may be used, as exemplified by description below.

Valve 20 works in this way: When shuttle 24 moves lengthwise, to and fro along length axis L of body 22, the area of the flow path portion 48, in vicinity of plug 26, varies, thus enabling throttling of the flow. When fully moved downstream (to the left in FIG. 1A and FIG. 2), the downstream end 34 of shuttle 24 closes off the flow path 48, as the bore of the shuttle fits over the circumscribing O-ring 53 at the nose 36 of plug 26.

Valve 20 can be operated with one hand; in particular it can be operated by a user's thumb while the valve is grasped in the hand. In other embodiments of the invention, a valve may have one tab and one opening 44 only; optionally, a valve may have more than two tabs and associated openings. The term "tab" shall comprehend other projections from the side of the shuttle that have shapes which are different from those of the exemplary tabs 30. Valve 20 and the other embodiments herein may be fitted with an actuator. A feature of the valve is that a linear actuator such as a solenoid may be used, compared to either a rotary motor or more expensive and bulky actuator that is required for a ball valve. A valve of the present invention has more favorable flow character than does a globe valve that is commonly operated by a solenoid.

In FIG. 1A shuttle 24 is shown in its open-flow position, that is, when it is retracted upstream. Thus, as indicated by arrow F, water will flow downstream within the bore 40 of the body 22 from the upstream end 80, then through the bore 42 of shuttle 24, then through generally annular portion 48 of the flow path which is in vicinity of the nose 36 of the plug, then through flow channels 46, and then out the downstream end 82 of the valve. FIG. 2 is a partial lengthwise cross section of valve 20, showing the shuttle in the closed position.

Figure 3:
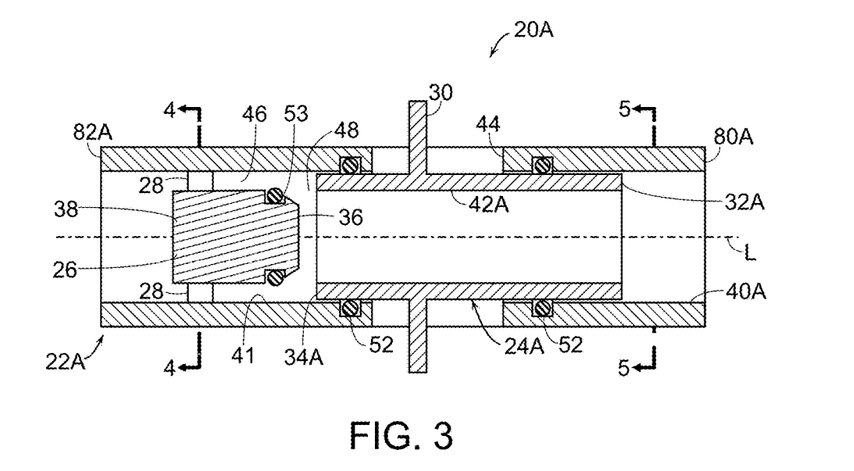
FIG. 3 is a lengthwise cross section of a valve like that of FIG. 1A, where the shuttle upstream end annular area is smaller than the shuttle downstream end annular area.

FIG. 3 shows valve 20A in lengthwise cross section. Valve 20A is mostly like valve 20 with some differences. described further below. FIG. 3 shows the valve with the shuttle 24A in the "open" position, to enable flow around the plug 26 FIG. 3 in combination with FIG. 2 illustrate how, when the shuttle is moved downstream, the shuttle downstream annular end slides over the nose end 36 of the plug 26 and seats on O-ring 53.

The following description refers to different regions within a valve, and how the presence of water within such region can affect the motion of the shuttle, in particular, a user's ease of movement of the shuttle. One region of focus is that which is downstream of the plug-to-shuttle seal of a closed valve, exemplarily regions 46, 146. Another focus is on the region between the plug and the bore-end of a shuttle, through which the water flows when the shuttle is in an open or disengaged-with-plug position, exemplarily regions 48, 148.

Preferably, when the shuttle is fully retracted (moved upstream), the area of the flow path (in short "flow area") in region 48 is equal or somewhat greater than the flow area within the bore 42 of the shuttle. Preferably, the total flow area of all the channels 46 around the plug in vicinity of the struts is about equal to or greater than the flow area within the bore 42 of the shuttle. (A more sophisticated analysis of flow, taking into account turbulence and boundary layer effects, may be employed to optimize the flow channel relationships along the flow path.) In the present invention, the shuttle bore 42 may have a dimension and cross sectional area which are only a bit less than the cross sectional area of the bore 40 of the body. And the flow area of bore 42 may be made equal to or greater than the flow area of a conventional female hose or hose fitting which is integral with or attached to the valve body (e.g., end 21). Thus a valve of the present invention does not necessitate a large exterior dimension of valve housing, compared for example to a ball valve.

In different embodiments of the invention, there are particular relationships between the annular area of the upstream end of the shuttle and the annular area of the downstream end of the shuttle. In one embodiment, the areas are equal. In another embodiment, the upstream end area is smaller than the downstream end area. In still another embodiment, the downstream end area is smaller than the upstream end area. As will be appreciated, the water pressure on the annular-end areas of a shuttle can affect the force required when manually opening and closing of the valve, that is, when moving the shuttle.

The foregoing different embodiments address different hydrodynamic situations and can help make movement of the shuttle easier or more positive. It is found that there can be resistance to closing or opening of the shuttle, both when there is pressurized water upstream of the shuttle-to-plug seal, or when there is water captured downstream of the shuttle-to-plug seal, e.g., in regions 46, 146 of exemplary valves.

Below, it is sometime stated in connection with some examples that water pressure may be present in the valve region 46 at the time when the valve is closed, that is when the shuttle is moved into sealing engagement with the plug. That typically will occur when there is a device with an on-off valve (such as a hand spray nozzle or a water powered device) downstream of the valve. Such downstream element will trap water in the region 46. And as the downstream end of a shuttle moves through the region 48 and into region 46, the downstream end of the shuttle can be envisioned as seeking to displace water which is captive in the region, leading to resistance to further downstream motion. Water can be captive in region 46 when the shuttle first engages the seal of the plug, and there is a device or fitting at the end 82 which blocks the flow of water downstream.

In other examples, there is no water trapped in region 46, and there is pressure upstream of the valve, i.e., at the inlet end. In such instances, substantial force on the shuttle may be required to move the shuttle upstream and open the valve. In still other examples, there can be differential dynamic forces on the shuttle which help move the shuttle upstream, when the valve is being opened.

Figure 5:
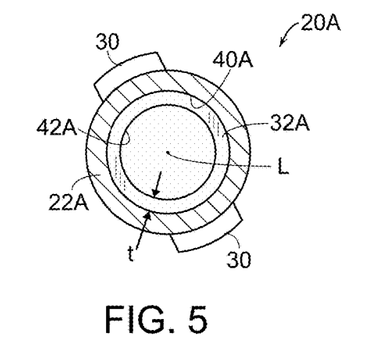
FIG. 5 is a transverse cross section of the valve shown in FIG. 3, upstream of the shuttle.

FIG. 5 is a cross section of valve 20A upstream of the shuttle, looking downstream. (The following applies to valve 20 as well.) FIG. 5 illustrates how face 32A of the upstream end of shuttle 24A is presented to any water within bore 40A. The face 34A of the downstream end presents to any water just upstream of channels 46. When the valve is open, channels 46 are in fluid communication with region 48, where water flows between the end of the shuttle and the plug. During use, the force on either shuttle face is a function of the local water pressure and the area of the face. When the shuttle is open so water is flowing in approximation of full flow, the pressure at the downstream end of the shuttle will be somewhat less than the pressure at the upstream end of the shuttle due to flow loss through the shuttle, but in many instances, including in discussion below unless stated otherwise, the pressures may be considered nominally equal.

In an embodiment of valve 20 of the present invention, illustrated by FIG. 2, the bore 40 of body 22 is of constant inside diameter and the areas of the ends 32, 34 of the shuttle 24 are equal. Now suppose that in valve 20A channels 46 are empty of water, as may often be the case if the downstream end of the valve connects directly or indirectly to free space, i.e., the atmosphere, and the valve is closed, with the shuttle mated with the plug. If there is pressurized water applied to the upstream end of the valve, the pressure on the upstream face of the shuttle will urge the shuttle downstream, and there will be resistance to any user attempt to move the shuttle upstream by means of the tabs 30. That resistance may be substantial. For example, if the shuttle has a 0.8 inch outside diameter and the upstream end wall has a radial width of 0.120 inch, (whereby the annular area is about 0.26 sq. inches) when water pressure is at 100 psi, the force to be overcome may be about 26 pounds.

Suppose now that such force is overcome and the shuttle is opened; water will flow. Now suppose there is a flow blocking device downstream of the valve and the downstream device is closed. Pressurized water will fill the spaces in channels 46. The pressure on the upstream and downstream faces of the shuttle will be the same, and given that they have equal areas, there will be no net lengthwise axis force.

In a preferred embodiment of the invention, the cylindrical wall thickness of the shuttle body is made very thin, to minimize the end-areas and forces mentioned above which affect the linear motion of the shuttle. In such an exemplary valve, the wall thickness is less than 0.050 inch, preferably in the range 0.020-0.030 inch, more preferably about 0.023 inch. The bore of the upper end 40 of the valve body 22 is about 0.682 inch, and the cross sectional area, also called the flow area, is about 0.365 square inches. A shuttle may have a radial clearance with the bore of at least about 0.005 inch. Preferably the clearance is about 0.007 inch, so the shuttle outside diameter will be about 0.668 inch. (That clearance is larger than commonly called for by conventional piston-within-cylinder design criteria.) The shuttle bore diameter will be about 0.622 inch when the wall is 0.023 inch thick; the associated flow area of the bore is about 0.304 square inches. The annular area at the upstream end of the shuttle is about 0.047 square inches. It can be appreciated that if water pressure is 100 psi, the force on the shuttle is about 4.7 pounds. Typically pressures lower than 100 psi may be expected at a typical garden hose bibcock in a U.S. domestic water system.

In the example just given, the area of the upstream end of the shuttle is about 12-13 percent of the flow area of bore of the valve body at the entrance to the shuttle. Similar calculations will show that a shuttle having a 0.030 inch thick wall will have an area that is about 16-17 percent of the flow area of the bore of the valve body. For functioning that is easy and within the capability of an average domestic garden user, or less demanding of an actuator, it is critical to an embodiment of the invention where the shuttle has the same wall thickness at the upstream and downstream ends that the area of the shuttle end be in less than 20 percent of the flow area of the bore of the valve body at the entrance to the shuttle, more preferably in the range 10-17 percent.

Now consider valve 20A in FIG. 3, which is an embodiment of the invention in which the shuttle has a smaller wall thickness and smaller annular area at upstream face 32A, compared to the downstream end. And when the shuttle is opened, the greater area at the downstream end of the shuttle (in context the bore diameter is constant) will result in a net biasing force on the shuttle in the upstream direction.

In the embodiment comprising valve 20A, illustrated by FIG. 3, the inside diameter of bore 40 of body 24 at the upstream end is smaller than the inside diameter of the bore 41 at the downstream end; and the bore 42A of the shuttle is constant diameter. Accordingly, the upstream end outside diameter of shuttle 24A is smaller than the downstream end outside diameter; the transition occurs at the location of tabs 30. Thus the shuttle 24A has a face 32A at the upstream end which presents a significantly smaller annular area than does the face 34A at the downstream end. As a result when water is flowing there is a net force on the shuttle which urges the shuttle in the upstream direction.

While both the upstream and downstream ends of the shuttle might be made small in area to reduce any biasing pressure force it may be preferred to have the downstream end be of a certain thickness to maintain structural integrity and absorb possible erosion or corrosion over time, or to engage properly the seal of the plug. Further, when the shuttle is open and water is flowing, the pressure in the area 48 will apply a force to the downstream face 34; that will overcome the force at the upstream end which pushes the shuttle in the direction of closing the valve. In a valve design which may be preferred, that keep-open force is larger than the close-force because the downstream end has a larger annual area than the upstream end, as described above in connection with valve 20. The downstream end is sufficiently large to compensate for the pressure difference between the upstream end and downstream end due to flow losses through the bore of the shuttle, thus providing a net bias force in the upstream direction.

Figure 6:
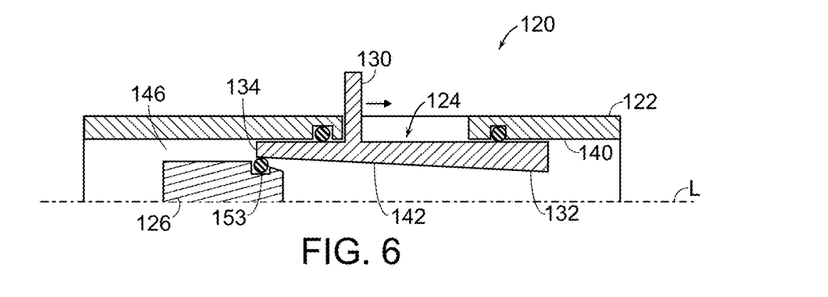
FIG. 6 is a lengthwise half cross section through a valve having a shuttle with a tapered interior bore.

FIG. 6 shows another exemplary valve 120, in partial lengthwise cross section. The valve has an overall configuration generally like that of valves 20, 20A. Shuttle 124 has opposing side tabs 130 and fits within the constant diameter bore 140 of valve body 122. When the shuttle is in its most downstream position, as shown in FIG. 6, the bore of the shuttle mates with the seal 153 of plug 126 to close off the flow path through the valve. The outside diameter of shuttle 124 is constant, and the bore 142 of shuttle 124 is tapered, with the taper diverging or expanding outwardly, in the downstream direction, toward the downstream shuttle end which mates with plug 126.

Figure 7:
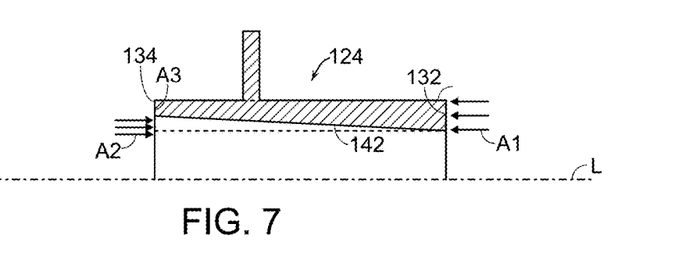
FIG. 7 is a lengthwise half cross section detail of the shuttle of the valve in FIG. 6.

FIG. 7 shows shuttle 124 of valve 120 in isolation, and portrays how the pressure of water (indicated by the multiple arrows) affects the shuttle. First, assume there is no pressure downstream of the plug, i.e., in region 146 in FIG. 6. Thus, when the valve is closed, there will be no fluid pressure on the end-area A3 of the face 134 of the downstream end of the shuttle. There will be force in the upstream direction (to the right in the Figure) due to fluid pressure applied to taper of the bore portion of the shuttle that is upstream of where the shuttle bore laps onto the seal 148. That force will be a function of the axially projected area A2 of the bore taper. The upstream end face 132 of the shuttle has an area A1, upon which the hydrostatic force presses, to urge the shuttle downstream.

In an embodiment of the invention of valve 120, the area A2 attributable to the taper of the bore is chosen so that the force on A2 is less than the force on A1. The result of that is that, under no-flow condition, the shuttle is biased toward the closed position; at the same time, undue force is not required to overcome the biasing force and move the shuttle from the closed position to an open position. When the valve is opened, or if there is pressure in region 146 when the valve is closed, there will be upstream fluid pressure force applied to the downstream face 134 which has area A3.

Figure 8:
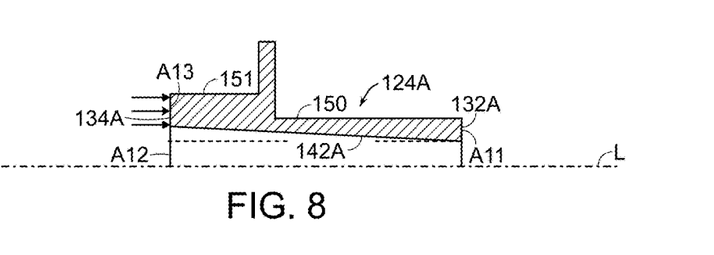
FIG. 8 is a lengthwise half cross section of the shuttle of an alternate embodiment valve.

FIG. 8 shows the shuttle 124A of a valve like valve 20A shown in FIG. 3. The shuttle has a stepped exterior diameter, and body of the valve has a stepped mating bore. The downstream portion 151 of the shuttle 124A has a diameter which is larger than the diameter at the upstream portion 150. The shuttle has an upstream end 132 with an area A11, a downstream end with an area A13 and a tapered bore with a projected area A12, in accord with the prior description of shuttle 124.

When shuttle 124A is closed and there is no water pressure in region 146, there is no upstream (valve-opening) force applied to area A3 of downstream face 134A; an upstream (valve-opening) force is applied to the bore 142A which has a projected area A12; and a downstream (valve-closing) force is applied to area A11 of upstream face 132A of the shuttle.

So, when a valve having shuttle 124A is open and water is flowing through the valve, there is downstream (closing) force applied to area A11 of face 132A and upstream (opening) force applied to both area A13 of downstream face 134A and bore 142A having projected area A12. Thus the keep-open force is increased in this configuration of shuttle, when the shuttle is moved to the open position, compared to that which is associated with shuttle 124.

Thus the relationships between A1/A11, A3/A13, and A2/A12 will be managed by changing the dimensions and areas of respectively the upstream end, the downstream end, and the degree of taper of the shuttle bore.

To have a good functioning valve, it has been discovered that it is critical to have certain configurations of O-rings, which are preferably made of a familiar material acrylonitrile butadiene, also referred to as "NBR" and "Buna-N", a synthetic rubber.

First, as to the O-rings 52, which seal the shuttle to the bore of the body: A typical shuttle bore diameter will be about $\frac{5}{8}^{th}$ of an inch. In the prior art, a conventional design of O-rings for use in seals like those of the present invention will provide them with a 70 Durometer. As noted above, the radial clearance between the shuttle and bore of the valve body is at least about 0.005 inch, preferably about 0.007 inch. Water flowing through garden hoses may be contaminated with particulate, for example, sand. It is found that unless the relative large clearance of the order of 0.005 to 0.007 inch is used, the shuttle can easily jam due to fine sand particle entrapment. Experiment showed that the combination of such clearance and 70 Durometer O-rings made the shuttled very difficult to more manually, regardless of whether water was present or not. The solution was found to comprise the use of O-rings which have a critical hardness of less than 60 Durometer, preferably Durometer 50. Having such a large clearance and using such a soft O-ring is contrary to accepted practice because it is conceived that the O-ring can extrude into the clearance space due to the differential pressure applied to the ring. However, in the valve of the present invention, it has been found necessary to have such features in order to achieve the low manual force which a common user is able to apply easily with one hand, finger, or thumb.

As an aside: In the generality of the invention, O-ring grooves may be put on the exterior circumference of the shuttle and not on the bore of the body to make the shuttle-body seals. However, that would necessitate a comparatively thick wall shuttle. There may be instances where that is acceptable, for instance for low fluid pressure fluids. As described elsewhere the forces that result when the shuttle wall is thick direct one away from such a sealing system when used in connection with domestic water systems.

Second, a great deal of development was also needed to find a satisfactory construction relating to how the plug makes a seal with the end of the shuttle. In one embodiment the plug comprises a surface of material which is resilient, sufficient to make a seal with the bore or leading edge of the second end of the shuttle. An O-ring is preferred because it is low cost, replaceable and different material selections are available. Thus a lot of work was done to develop seals of the kind like seals 53, 153, which are at the end the plug, to engage the bore of the shuttle.

Figure 9:
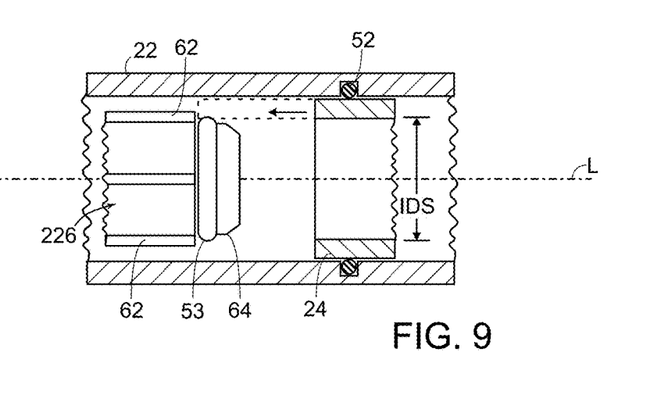
FIG. 9 is a partial lengthwise cross section through a valve, similar to the drawing of FIG. 2.
Figure 10:
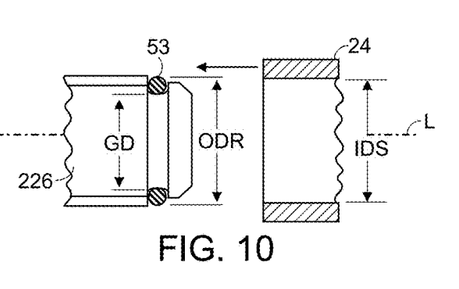
FIG. 10 is a partial lengthwise exploded view showing a portion of plug and a mating shuttle in cross section.
Figure 11:
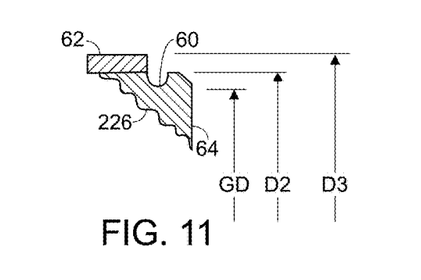
FIG. 11 is a partial cross section of the upstream end of the plug shown in FIG. 10.

FIG. 9 to 12 show plug 226, and its associated seal 53. FIG. 9 is a portion of a partial cross section of a valve. O-ring 53 is in a groove 60 on the nose of a plug. Among the problems to be solved were getting a good seal, avoiding excessive force to retract the shuttle (i.e., to open the valve to flow), and most particularly, avoiding an observed tendency for lifting of the O-ring out of the groove during high flow of water through the valve. The conventional O-ring groove and fit dimensions did not produce good result.

Plug 226 has a tapered upstream end, or nose 64, shaped for easy water flow. The plug comprises a plurality of radially outwardly-extending lands 62 which act as stops. The lands prevent the ring 53 from moving downstream in face of a tendency for the flow of water to expand the resilient O-ring radially outwardly, so it lifts out of the groove 60. The lands 62 may be optionally integral with struts 28 when struts are present in proximity to groove 60, as will be seen is the case for plug 326, described below.

Further in reference to FIG. 9-12, the manner in which exemplary O-ring 53, made of Buna-N, is combined with plug 226 is characterized by unique features and criticalities, as follows:

(a) The bottom of groove 50 is rounded, not square as conventional. See FIG. 11. (Normally, a flat bottom groove provides space for expansion of the O-ring as it is compressed inwardly, in this instance, by the shuttle riding up onto the ring.)

(b) The O-ring diameter is chosen so that the O-ring is stretched when positioned within the groove. Preferably, the radial stretch is about 10-20 percent or more.

(c) The squeeze or radially-inward compression of O-ring, when the shuttle moves onto the plug, is between 0.004-0.006 inch, preferably about 0.005 inch. That is much less than conventional practice dictates. (Thus on a diametrical basis, the squeeze would be 0.008-0.012 inch, preferably about 0.010 inch.)

(d) The Durometer of the ring is at least 70.

Thus dimension ODR of the O-ring when it is in place in the groove 60 is about 0.010 inch more than the dimension IDS of the bore of the shuttle 24 where it overlaps the plug. See FIG. 10.

As an example of the foregoing: An AS568-110 type O-ring is be put in a groove 60 which has a radius-bottom that nominally fits the about 0.103 inch diameter O-ring. The groove has a minor diameter GD of about 0.441 inch. The diameter D2 of the nose and of the body adjacent the groove is about 0.615 inch. That combination results in the desired stretch approaching, or greater than, about 20%.

Thus, to summarize, in a preferred embodiment of the invention, the plug of the valve comprises an O-ring seal shaped for being overlapped by the end of the bore of the shuttle, and one or more—preferably all, of the following features are present: (a) the O-ring groove on the plug has a curved bottom shaped to fit the cross sectional diameter of the O-ring; (b) when the O-ring is in place on the plug, it has an outside radius which is about 0.004-0.006 inch greater than is the radius of the bore of the shuttle which overlaps the O-ring; (c) the O-ring 53 has a stretch of at least 10-20 percent after it is installed in the groove; and (d) the O-ring 53 has a Durometer of 70.

Figure 12:
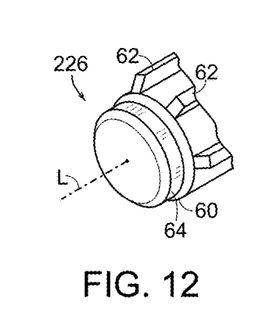
FIG. 12 is a perspective view of a plug, showing the upstream end.
Figure 12A:
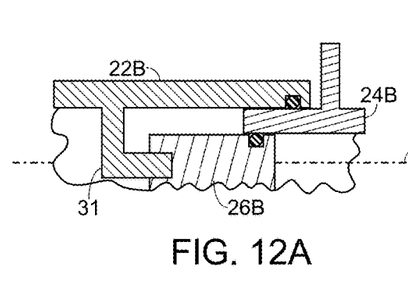
FIG. 12A is a partial transverse cross section of a valve, like that of FIG. 3, showing an alternate embodiment of plug positioning.

Referring again to the seals 52, 152 which seal the space between the shuttle exterior and the bore of the valve body, alternative embodiment sealing may be used. For example, seals may be set within grooves on the exterior of the shuttle (when the wall thickness permits) instead of in grooves with the bore of the valve body, as previously shown. For example, generally rectangular shape grooves may be placed within the bore of the valve body, so they circumscribe the each opening 44. A plug may be supported within the valve body by means other than radial struts than have been described above, and are described below. FIG. 12A is a partial cross section of a valve like that shown in FIG. 3 showing an alternative method of supporting the plug within the bore of the valve body. An L shape bracket 31 extends from the interior wall of the valve body 22B and holds the plug 26B in the center of the valve body so it can be engaged by the shuttle 24B. There may be more than one L shape bracket.

Figure 13:
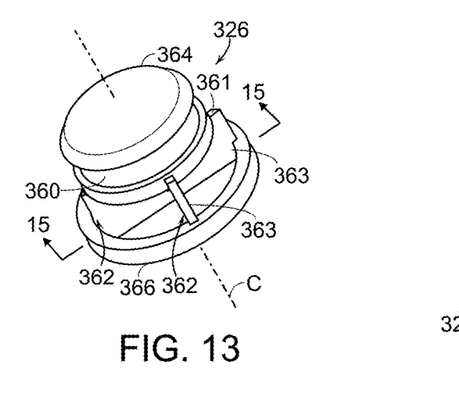
FIG. 13 is a perspective view of a plug.
Figure 14:
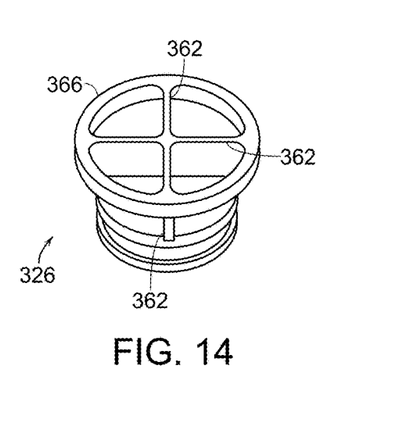
FIG. 14 is another view of the plug of FIG. 13, showing the base ring in the upward direction.
Figure 15:
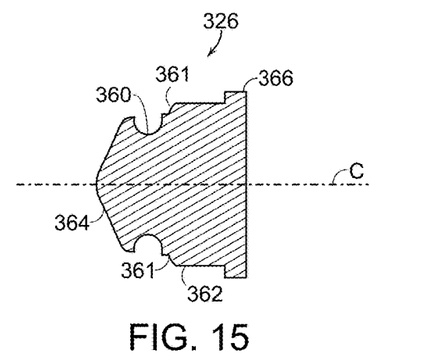
FIG. 15 is a cross section through the plug of FIG. 13.
Figure 20:
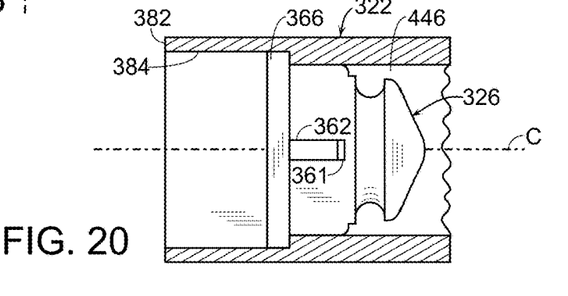
FIG. 20 is a partial cross section of the end of a valve showing a plug within the bore of the valve.

The perspective views of FIG. 13-14 and the cross section view of FIG. 15 show plug 326 which is a preferred embodiment. Preferably the plug is one piece molded plastic. As illustrated by FIG. 20, plug 326 plug slips within a recess 384 of the bore of the downstream end 382 of a valve body 322, which is like that shown in the other Figures. The ring shape base 366 sets against a shoulder in the bore, so it is properly located axially with respect to the shuttle. The radially-outermost edges of the struts contact the bore upstream of the recess 384, for support. A retaining ring or other fitting, not shown, retains the plug in place as needed, to resist axial force from the shuttle and water, which tend to push it out of the recess. Plug 326 has a nose 364 which has an O-ring groove 360, in accord with previously described plugs. There are four radially-running struts 362 which intersect at the centerline C of the plug and support the nose, being integral with its back end. Each strut 362 has two opposing side radially running surfaces 363. The struts have upstream ends 361 which function as lands like those described for plug 226. The land-ends of the struts are located in proximity to the O-ring groove, for the ring-retaining purpose previously described.

Figure 17:
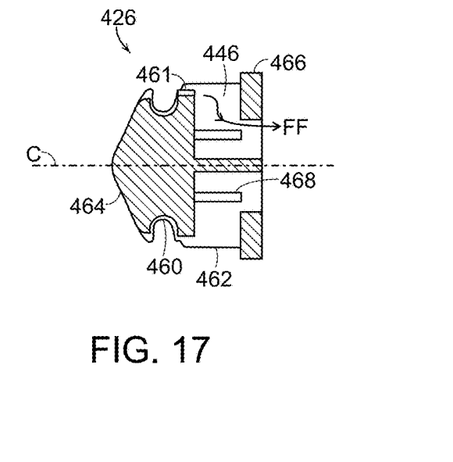
FIG. 17 is an off-center lengthwise cross section of the plug of FIG. 16.
Figure 18:
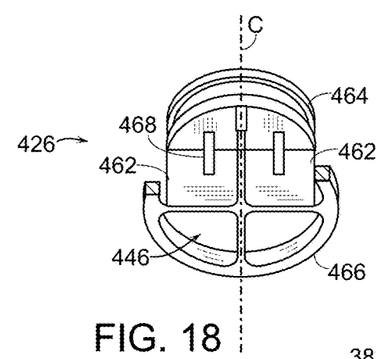
FIG. 18 is a cutaway perspective view of the plug of FIG. 16, looking at the ring end.
Figure 19:
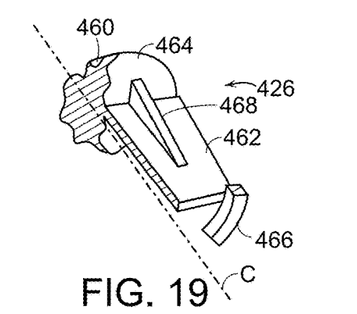
FIG. 19 is a fragmentary perspective view of the plug of FIG. 16, looking at the ring end.

It is desirable to maximize flow area in the plug region and to minimize pressure losses due to turbulence. FIG. 17-19 show another monolithic structure plug 426 which is a modification of plug 326. Plug 426 comprises a ring shape base 466 and four struts 468 which are integral at their outer edges with the ring 466. The struts are integral with each other and run at 90 degree angles to each other, meeting in at the center line C. Each strut has a front end 461 which is in proximity to the O-ring groove as described for plug 326, to help retain the O-ring. Each strut 462 comprises two integral fins 468. Each fin is tapered so it has decreasing height in the downstream direction. The fins achieve the dual purposes of (a) providing strength and enabling thinner section size in the strut and (b) channeling (straightening) flow in the region downstream of the nose 464 of the plug, in the regions 446 that are amongst the struts (comparable to regions 46 described above in connection with embodiments of valves. The off-center cross section of FIG. 17 shows how water flows through regions 446 of the plug, indicated by the arrow FF. More than one fin may be used on each side of a strut in other embodiments.

Figure 16:
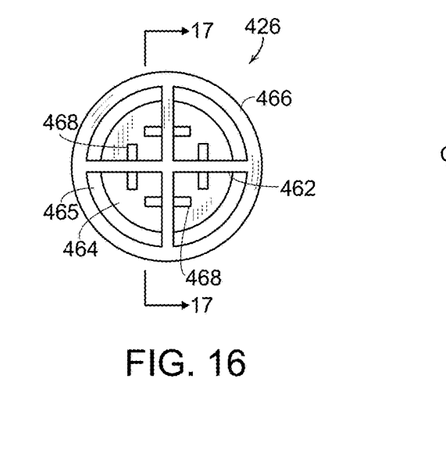
FIG. 16 is an end view of an embodiment of plug like that of FIG. 13 where there are in addition fins on the struts.

The rear end view of FIG. 16 shows the radial opening 465 of the flow path around the plug, upstream of the struts. The partial cutaway rear end view of FIG. 18 and perspective cutaway fragment of FIG. 19 further show the shape and placement of the fins within the configuration of the plug. Alternative embodiments of plug may comprise fewer or more than four struts and associated fins.

Figure 21:
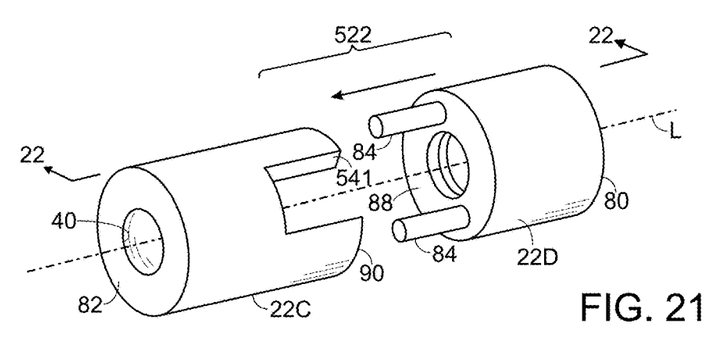
FIG. 21 is an exploded view of a valve body.
Figure 22:
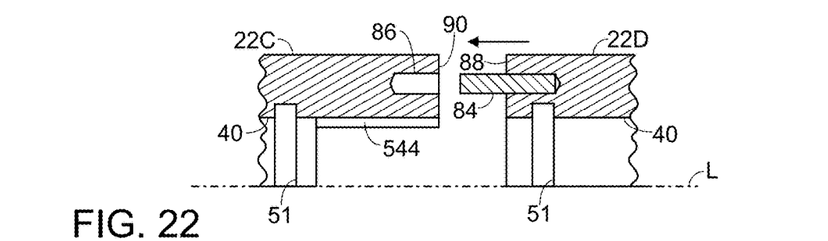
FIG. 22 is a partial lengthwise cross section through the exploded body part of FIG. 21.

With reference to FIG. 1 and the joint 25, FIG. 21 is an exploded view of preferred valve body 522 comprised of two mating parts. FIG. 22 is a partial cross section through the exploded components.

Valve body 522 is comprised of mating body parts, 22C and 22D which mate at respective transverse face surfaces 90, 88, as indicated by the arrow in each Figure. Each body part has a bore 40 shaped to receive a shuttle and a groove 51 for receiving an O-ring 52, not shown here, that forms a seal with the shuttle. Body part 22C has two opposing side cutouts 544 which, when the body parts are mated, provide the assembled body with openings 44 for the tabs of the shuttle, as previously described for valve 20. Two pins 84 extend from face 88 of part 22D and are received in cavities 86 on the face 90 of part 22C, since the mouths of the cavities line-up when the joining surfaces are mated.

In a preferred embodiment, the pins 84 are press fitted into the part 22D and when the parts are mated the pins are press fitted into cavities 86. Optionally, the pins and the body parts are all made of aluminum alloy and the pins may have knurling or other texturing. Thus when the pins are press fitted together there is otherwise undesirable galling of each pin within its cavity, with the result the mated parts 22C, 22D are sufficiently resistant to coming apart that other means of holding them together are not needed. The location of the joint relative to the elongated opening for the one or more tabs means that the shuttle can be put in place prior to mating of the two body parts. The location of the joint relative to the O-ring seals means that a sealant is not needed, because fluid cannot migrate to the tab opening. In variations on the foregoing, before mating, one pin may project from the surface of the first body part and the other pin may project from the surface of the second body part. Optionally, more than two pins may be used. In alternative embodiments of valve body construction, the pins may be present or may be omitted and the mating surfaces of the body parts are held to each other by an adhesive or weld or by mechanical latching or fasteners, none shown. The joint between the mating parts runs transverse to the length axis and is preferably planar and perpendicular to the length axis of the valve. In the generality of the invention the transverse joint may have non-perpendicular orientation or be non-planar; e.g. it may be stepped.

The valve body and shuttle are preferably made of aluminum with appropriate surface finish such as anodizing or plating. They may alternately be made of other non-ferrous metal, of ferrous metal or of plastic. The plug is preferably made of molded plastic such as polyethylene or polypropylene or ABS, alternatively of other plastic or ceramic or metal.

In a use of a valve of the present invention, the valve is connected to a bibcock, or in-line, or at the end of a hose so water enters the bore of the shuttle and flows toward the plug. To enable water to flow, the user moves the shuttle axially in the upstream direction by pressing on the tabs, typically by holding the valve in the palm of the hand and pressing on a shuttle tab with the thumb. The reverse action is used to stop flow. While use with domestic hoses is the primary use which is presently envisioned, the invention may be used in other applications and in smaller and larger sizes than have been described.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A valve, adapted for inline installation along the flow path of a conduit for controlling flow of fluid within the conduit, the valve having a lengthwise axis and lengthwise flow path running from an upstream first end to a downstream second end, which comprises:
  a body having a length, an associated central lengthwise axis, an exterior surface, a bore having a round cross section, a first end, a second end, and at least one opening having a lengthwise-elongate shape in the side of the body, the at least one opening running between said bore with said exterior surface;
  a plug, fixedly mounted within the bore of the body and along said lengthwise flow path proximate the second end of the body;
  a shuttle having a length, an exterior surface, a bore, an upstream first end and a downstream second end, the shuttle mounted slidingly within the bore of the body for movement lengthwise therein toward and away from said plug, the shuttle having an annular first end and an annular second end; the shuttle having at least one tab integral with said exterior surface of the shuttle, wherein the at least one tab extends through and is movable lengthwise within said at least one opening of the body, and wherein the shuttle bore at the second end of the shuttle is shaped to receive the nose of the plug;
  wherein said body, said at least one tab, and at least one opening are shaped to enable manual lengthwise moving of said at least one tab, thereby to move the shuttle lengthwise within the body from a first position at which the second end of the shuttle is sealingly engaged with the nose of the plug to a second position at which the second end of the shuttle is spaced apart from the plug and flow of fluid around the plug is enabled; and,
  two seals between the bore of the body and the shuttle exterior surface, the seals spaced apart from each other by said at least one opening, to prevent flow of fluid from said valve flow path into said at least one opening.

2. The valve of claim 1 wherein said seals are circumferential O-ring seals contained within grooves in the bore of the valve body.

3. The valve of claim 2 wherein the diameter of the exterior surface of the shuttle is 0.005 to 0.007 inch smaller than the diameter of the bore portion of the body in which the shuttle is movable lengthwise; wherein said O-ring seals are made of material having a hardness of Durometer 50 to Durometer 60.

4. The valve of claim 1 wherein the valve body has a second opening like said at least one opening, the second opening diametrically opposed to the at least one opening; and wherein the shuttle has a second tab like said at least one tab, the second tab diametrically opposed to the at least one tab; wherein the second tab is positioned within said second valve body opening.

5. The valve of claim 1 wherein both the portion of the bore of the body within which the shuttle is movable and the exterior surface of the shuttle have constant diameters; wherein the bore of the shuttle has a constant diameter; and wherein the shuttle has an annular area at the shuttle first end which equal to the annular area at the shuttle second end.

6. The valve of claim 5 wherein the bore of said body has a flow area upstream of the shuttle and the upstream end of the shuttle has a cross sectional area; and wherein said shuttle cross sectional area is between 10 and 20 percent of the body flow area.

7. The valve of claim 1 wherein the plug comprises a plurality of radially running struts which are in contact with the bore of the body, the struts positioning the nose of the plug in the flow path; and wherein spaces between the struts enable fluid to flow past the plug in the downstream direction of the valve.

8. The valve of claim 1 wherein the portion of the bore of the body within which the shuttle is movable and the exterior surface of the shuttle each have a constant diameter; wherein the bore of the shuttle is tapered and diverges in the downstream direction; and wherein the shuttle has an annular area at the first end which is greater than the annular area at the shuttle second end.

9. The valve of claim 1 wherein the valve has female garden hose thread at the first end of the body and a male garden hose thread at the second end of the body.

10. The valve of claim 1 wherein the portion of the bore of the body within which the shuttle is movable has a diameter near the first end of the valve which is different from the diameter of the bore of the body which is near the second end of the body, and the diameter of the exterior surface of the shuttle at the first end of the shuttle is different from diameter of the exterior surface of the shuttle at the second end of the shuttle.

11. The valve of claim 10 wherein the shuttle has a tapered bore.

12. The valve of claim 10 wherein the bore of the shuttle diverges in the downstream direction; wherein said portion of the bore of the body which is near the first end of the body has the larger diameter; and wherein the exterior surface of the shuttle which is near the second end of the shuttle has the larger diameter.

13. The valve of claim 10 wherein the bore of the shuttle has constant diameter; wherein said portion of the bore of the body which is near the first end of the body has the larger diameter; and wherein the exterior surface of the shuttle which is near the second end of the shuttle has the larger diameter.

14. A valve adapted for inline installation along the flow path of a conduit for controlling flow of fluid within the conduit, the valve having a lengthwise axis and lengthwise flow path running from an upstream first end to a downstream second end, the valve comprising:
  a body having a length, an associated central lengthwise axis, an exterior surface, a round cross section bore, a first end, a second end, and at least one opening in the side of the body connecting said bore with said exterior;
  a plug, fixedly mounted within the bore of the body and along said lengthwise flow path proximate the second end of the body, the plug comprising a nose;
  the shuttle having a length, an exterior surface, a bore, an upstream first end and a downstream second end, the shuttle mounted slidingly within the bore of the body for movement lengthwise therein toward and away from said plug, the shuttle having an annular first end and an annular second end; the shuttle at least one tab extending from the exterior surface of the shuttle, the tab further extending through said at least one opening of the body; wherein the shuttle bore at the second end of the shuttle is shaped to receive the nose of the plug;

at least one seal between the bore of the body and the shuttle exterior surface, for preventing flow of fluid between the bore of the body and the shuttle exterior surface to said at least one opening;

wherein said body, said at least one tab, and at least one opening are shaped to enable manual lengthwise moving of said at least one tab, thereby to move the shuttle lengthwise within the body from a first position at which the second end of the shuttle is sealingly engaged with the nose of the plug to a second position at which the second end of the shuttle is spaced apart from the plug and flow of fluid around the plug is enabled;

wherein the plug comprises a plurality of radially running struts which are in contact with the bore of the body, the struts positioning the nose of the plug in the flow path; and wherein spaces between the struts enable fluid to flow through the bore of the shuttle and around the plug in the downstream direction of the valve; and, wherein each strut of the plug has opposing side radially-extending surfaces, further comprising: at least one integral fin on at least one said radially-extending surface of the strut, the fin running lengthwise with respect to the lengthwise axis of the valve.

15. The valve of claim 14 wherein the plug comprises four struts and each strut has an integral fin on each of the two radially running surfaces of the strut.

16. A valve adapted for inline installation along the flow path of a conduit for controlling flow of fluid within the conduit, the valve having a lengthwise axis and lengthwise flow path running from an upstream first end to a downstream second end, the valve comprising:

a body having a length, an associated central lengthwise axis, an exterior surface, a round cross section bore, a first end, a second end, and at least one opening in the side of the body connecting said bore with said exterior surface;

a plug, fixedly mounted within the bore of the body and along said lengthwise flow path proximate the second end of the body, the plug comprising a nose;

a shuttle having a length, an exterior surface, a bore, an upstream first end and a downstream second end, the shuttle mounted slidingly within the bore of the body for movement lengthwise therein toward and away from said plug, the shuttle having an annular first end and an annular second end; the shuttle having at least one tab extending from the exterior surface of the shuttle, the tab further extending through said at least one opening of the body; wherein the shuttle bore at the second end of the shuttle is shaped to receive the nose of the plug;

at least one seal between the bore of the body and the shuttle exterior surface, for preventing flow of fluid between the bore of the body and the shuttle exterior surface to said at least one opening;

wherein said body, said at least one tab, and at least one opening are shaped to enable manual lengthwise moving of said at least one tab, thereby to move the shuttle lengthwise within the body from a first position at which the second end of the shuttle is sealingly engaged with the nose of the plug to a second position at which the second end of the shuttle is spaced apart from the plug and flow of fluid through the bore of the shuttle and around the plug is enabled; and, wherein the plug comprises an O-ring seal on the nose, said O-ring seal shaped for being overlapped by the second end of the bore of the shuttle when the shuttle moves toward the plug, wherein the plug further comprises:

(a) an O-ring groove on the nose of the plug having a curved groove bottom shaped to fit the cross sectional diameter of the O-ring with the groove;

(b) an O-ring positioned within the groove, the O-ring having
  (i) an outside circumferential surface which is about 0.008-0.012 inch greater in dimension than the diameter of the bore portion of the shuttle which overlaps the O-ring, when the shuttle is engaged with the plug;
  (ii) a Durometer of 70; and,
  (iii) a stretch of 10-20 percent.

17. A valve adapted for inline installation along the flow path of a conduit for controlling flow of fluid within the conduit, the valve having a lengthwise axis and lengthwise flow path running from an upstream first end to a downstream second end, the valve comprising:

a body having a length, an associated central lengthwise axis, an exterior surface, a round cross section bore, a first end, a second end, and at least one opening in the side of the body connecting said bore with said exterior surface;

a plug, fixedly mounted within the bore of the body and along said lengthwise flow path proximate the second end of the body, the plug comprising a nose;

a shuttle having a length, an exterior surface, a bore, an upstream first end and a downstream second end, the shuttle mounted slidingly within the bore of the body for movement lengthwise therein toward and away from said plug, the shuttle having an annular first end and an annular second end; the shuttle having at least one tab extending from the exterior surface of the shuttle, the tab further extending through said at least one opening of the body; wherein the shuttle bore at the second end of the shuttle is shaped to receive the nose of the plug;

at least one seal between the bore of the body and the shuttle exterior surface, for preventing flow of fluid between the bore of the body and the shuttle exterior surface to said at least one opening;

wherein said body, said at least one tab, and at least one opening are shaped to enable manual lengthwise moving of said at least one tab, thereby to move the shuttle lengthwise within the body from a first position at which the second end of the shuttle is sealingly engaged with the nose of the plug to a second position at which the second end of the shuttle is spaced apart from the plug and flow of fluid around the plug is enabled; and, wherein the plug nose has a circumscribing O-ring groove and an O-ring seal in the groove, the O-ring sized to fit within the second end of the shuttle;

further comprising a plurality of lands on the nose of the plug, the lands projecting radially outwardly from the nose at a location which is downstream from, and in close proximity to, the O-ring groove, for restraining the O-ring from escaping the groove when the shuttle second end is spaced apart from the nose of the plug and fluid is flowing through the valve.

18. The valve of claim 17 wherein the plug further comprises a plurality of radially running struts in contact with the bore of the body and positioning the nose of the plug in the flow path; wherein spaces between the struts define spaces for water to flow past the plug in the downstream direction of the valve; and wherein said struts have upstream ends which comprise said lands.

19. A valve adapted for inline installation along the flow path of a conduit for controlling flow of fluid within the conduit, the valve having a lengthwise axis and lengthwise flow path running from an upstream first end to a downstream second end, the valve comprising:

a body having a length, an associated central lengthwise axis, an exterior surface, a round cross section bore, a first end, a second end, and at least one opening in the side of the body connecting said bore with said exterior surface;

a plug, fixedly mounted within the bore of the body and along said lengthwise flow path proximate the second end of the body, the plug comprising a nose;

the shuttle having a length, an exterior surface, a bore, an upstream first end and a downstream second end, the shuttle mounted slidingly within the bore of the body for movement lengthwise therein toward and away from said plug, the shuttle having an annular first end and an annular second end; the shuttle at least one tab extending from the exterior surface of the shuttle, the tab further extending through said at least one opening of the body; wherein the shuttle bore at the second end of the shuttle is shaped to receive the nose of the plug;

at least one seal between the bore of the body and the shuttle exterior surface, for preventing flow of fluid between the bore of the body and the shuttle exterior surface to said at least one opening;

wherein said body, said at least one tab, and at least one opening are shaped to enable manual lengthwise moving of said at least one tab, thereby to move the shuttle lengthwise within the body from a first position at which the second end of the shuttle is sealingly engaged with the nose of the plug to a second position at which the second end of the shuttle is spaced apart from the plug and flow of fluid through the bore of the shuttle and around the plug is enabled; and, wherein the body is further comprised of a first body part and a second body part, each body part having a joint surface in contact with the joint surface of the other body part, the joint surfaces mated with each other to form a valve body joint that runs transverse to the lengthwise axis of the valve and that intersects said at least one opening; the joint surface of each body part having a multiplicity of lengthwise-running cavities, the mouths of the cavities in the first part aligned with the mouths of the cavities in the second part; and a plurality of pins, each pin running across said joint within one of a pair of mated cavities, each pin press fitted into each of the mated cavities, thereby preventing the first body part from separating from the second body part at the joint.

* * * * *

UNITED STATES PATENT AND TRADEMARK OFFICE
CERTIFICATE OF CORRECTION

PATENT NO. : 10,082,209 B1
APPLICATION NO. : 15/354849
DATED : September 25, 2018
INVENTOR(S) : Viggiano Page 1 of 1

It is certified that error appears in the above-identified patent and that said Letters Patent is hereby corrected as shown below:

In the Claims

Column 15, Line 18, (approx.) In Claim 14, after "shuttle", insert --having--

Signed and Sealed this
Fourth Day of February, 2020

Andrei Iancu
*Director of the United States Patent and Trademark Office*